United States Patent
Liang et al.

(10) Patent No.: US 7,872,442 B2
(45) Date of Patent: Jan. 18, 2011

(54) APPARATUS FOR CHARGING A BATTERY OF A PORTABLE ELECTRONIC DEVICE

(75) Inventors: Yong Liang, Gilbert, AZ (US); Bernard Coll, Fountain Hills, AZ (US); Jerry Hallmark, Gilbert, AZ (US)

(73) Assignee: Motorola Mobility, Inc., Libertyville, IL (US)

( * ) Notice: Subject to any disclaimer, the term of this patent is extended or adjusted under 35 U.S.C. 154(b) by 205 days.

(21) Appl. No.: 11/862,343

(22) Filed: Sep. 27, 2007

(65) Prior Publication Data

US 2009/0085512 A1   Apr. 2, 2009

(51) Int. Cl.
H02J 7/00 (2006.01)
H01L 35/00 (2006.01)
H01L 31/042 (2006.01)
H02N 6/00 (2006.01)

(52) U.S. Cl. .................. 320/101; 136/206; 136/244; 136/246; 136/257

(58) Field of Classification Search ............ 320/101; 136/247
See application file for complete search history.

(56) References Cited

U.S. PATENT DOCUMENTS

| | | | |
|---|---|---|---|
| 5,898,932 A | 4/1999 | Zurlo et al. | |
| 5,936,193 A * | 8/1999 | Parise | 136/205 |
| 6,538,191 B1 * | 3/2003 | MacDonald | 136/247 |
| 6,586,906 B1 | 7/2003 | Bessa | |
| 6,750,393 B2 * | 6/2004 | Wada et al. | 136/256 |
| 6,919,119 B2 | 7/2005 | Kalkan et al. | |
| 7,206,044 B2 | 4/2007 | Li et al. | |
| 7,541,537 B2 * | 6/2009 | Madigan | 136/247 |
| 2002/0088486 A1 | 7/2002 | Chen | |
| 2003/0134668 A1 | 7/2003 | Mekuria | |
| 2004/0112421 A1 | 6/2004 | Spivack et al. | |
| 2005/0098204 A1 | 5/2005 | Roscheisen et al. | |
| 2005/0098205 A1 | 5/2005 | Roschiesen et al. | |
| 2005/0236033 A1 | 10/2005 | Lawandy | |

(Continued)

FOREIGN PATENT DOCUMENTS

DE    35 22 602 A1    1/1986

OTHER PUBLICATIONS

Dafni Koutsorodis, "PCT International Search Report and Written Opinion," WIPO, ISA/EP, European Patent Office, Rijswijk, Netherlands, Mar. 24, 2009.

(Continued)

*Primary Examiner*—Edward Tso
*Assistant Examiner*—Ahmed Omar

(57) ABSTRACT

A power source (212) is disclosed for charging a battery (330) within a portable electronic device (310). An apparatus (422), such as a photovoltaic or thermoelectric cell, for charging the battery (330) is disposed contiguous to and within a transparent housing (412) of the portable electronic device (310). A fluorescent species (416), such as quantum dots or a fluorescent dye, is disposed on a side of the housing (412) opposed to the apparatus (422). Light (430) striking the fluorescent species (416) is converted into photons (432, 434) having a narrower spectrum that passes through the housing (412) to the apparatus (422). An optional layer (418) may be disposed on the fluorescent species (416) that reflects light from the fluorescent species (416) to the apparatus (422). Photonic crystals (415) may be combined with the fluorescent species (416) to increase reflectivity.

8 Claims, 3 Drawing Sheets

U.S. PATENT DOCUMENTS

| | | |
|---|---|---|
| 2006/0021647 A1 | 2/2006 | Gui et al. |
| 2006/0130889 A1* | 6/2006 | Li et al. ............... 136/244 |
| 2006/0137739 A1 | 6/2006 | Imoto et al. |
| 2008/0185041 A1* | 8/2008 | Sharma et al. .............. 136/261 |
| 2009/0085512 A1 | 4/2009 | Liang et al. |
| 2009/0217963 A1 | 9/2009 | Liang et al. |

OTHER PUBLICATIONS

Maruyama, T.,et al., Solar Cells Coated with Fluorescent Coloring Agent, J. Electrochem. Soc., vol. 145., No. 8, Aug. 1998.

Maruyama, T.,et al., Solar Cells Module with Fluorescent Plate, Elsevier, Solar Energy and MAterials & Solar Cells 64 (2000) 269-278.

Richards, B.S., Luminescent layers for enhanced silicon solar cell performance: Down-conversion, Elsevier, Solar Energy and Materials & Solar Cells 90 (2006) 1189-1207.

Richards, B.S., Enhancing the performance of silicon solar cells via the application of passive luminescense conversion layers, Elsevier, Solar Energy and Materials & Solar Cells 90 (2006) 2329-2337.

Akhtar, M., et al Quasi-solid state dye sensitized solar cell based on poly (acrylonitrile-co-methacrylonitrile)- silica gel electrolyte, 1-4244-0016 - Feb. 2006 IEEE, pp. 1568-1571.

Joseph J., Quasi-solid state dye-sensitized solar cells with siloxane poly (ethylene glycol) hybrid gel electroloyte, Institute of Physics Publishing, Semicond. Sci, Technol. 21 (2006) 697-701.

Wang, P. et al, High efficiency dye-sensitized nanocrystalline solar cells based on ionic liquid polymer gel electrolyte, The Royal Society of Chemistry 2002, Chem. Comm. 2002-2972-2973.

An, H., et al, Environmentally friendly Li/ethanol based gel electrolyte for dye-sensitized solar cells, Electrochemistry Communications 8 (2006) 170-172.

* cited by examiner

APPARATUS FOR CHARGING A BATTERY OF A PORTABLE ELECTRONIC DEVICE

FIELD

The present invention generally relates to portable electronic devices and more particularly to a method and apparatus for charging a battery of a portable electronic device.

BACKGROUND

The market for personal portable electronic devices, for example, cell phones, laptop computers, personal digital assistants (PDAs), digital cameras, and music playback devices (MP3), is very competitive. Manufacturers, distributors, service providers, and third party providers have all attempted to find features that appeal to the consumer. For example, manufacturers are constantly improving their product with each model in the hopes it will appeal to the consumer more than a competitor's product. Battery life is one area in which improvements are sought.

Rechargeable batteries are currently the primary power source for cell phones and various other portable electronic devices. The energy stored in the batteries is limited. It is determined by the energy density (Wh/L) of the storage material, its chemistry, and the volume of the battery. For example, for a typical Li ion cell phone battery with a 250 Wh/L energy density, a 10 cc battery would store 2.5 Wh of energy. Depending upon the usage, the energy could last for a few hours to a few days. Recharging often requires access to an electrical outlet. The limited amount of stored energy and the frequent recharging are major inconveniences associated with batteries. Accordingly, there is a need for a longer lasting, easily recharging solution for cell phone power sources. One approach to fulfill this need is to have a hybrid power source with a rechargeable battery and a method to trickle charge the battery. Important considerations for an energy conversion device to recharge the battery include power density, size, and the efficiency of energy conversion.

Energy harvesting methods such as solar cells, thermoelectric generators using a temperature gradient, and mechanical/kinetic generators using mechanical motion are very attractive power sources to trickle charge a battery. However, the energy generated by these methods is often small, usually only a few milliwatts to approximately a few hundred milliwatts depending on size, efficiency, nature of the energy source, etc. In the regime of interest, namely, a few hundred milliwatts to a few watts, this dictates that a sizeable volume or area is required to generate sufficient power for trickle charge. Such methods include coupling the battery to a solar panel (photovoltaic cell). See for example, U.S. Pat. No. 5,898,932 issued on 27 Apr. 1999.

Accordingly, it is desirable to provide an apparatus for efficiently charging a battery of a portable electronic device. Furthermore, other desirable features and characteristics of the present invention will become apparent from the subsequent detailed description and the appended claims, taken in conjunction with the accompanying drawings and this background.

BRIEF DESCRIPTION OF THE DRAWINGS

Embodiments of the present invention will hereinafter be described in conjunction with the following drawing figures, wherein like numerals denote like elements.

DETAILED DESCRIPTION

Figure 1:
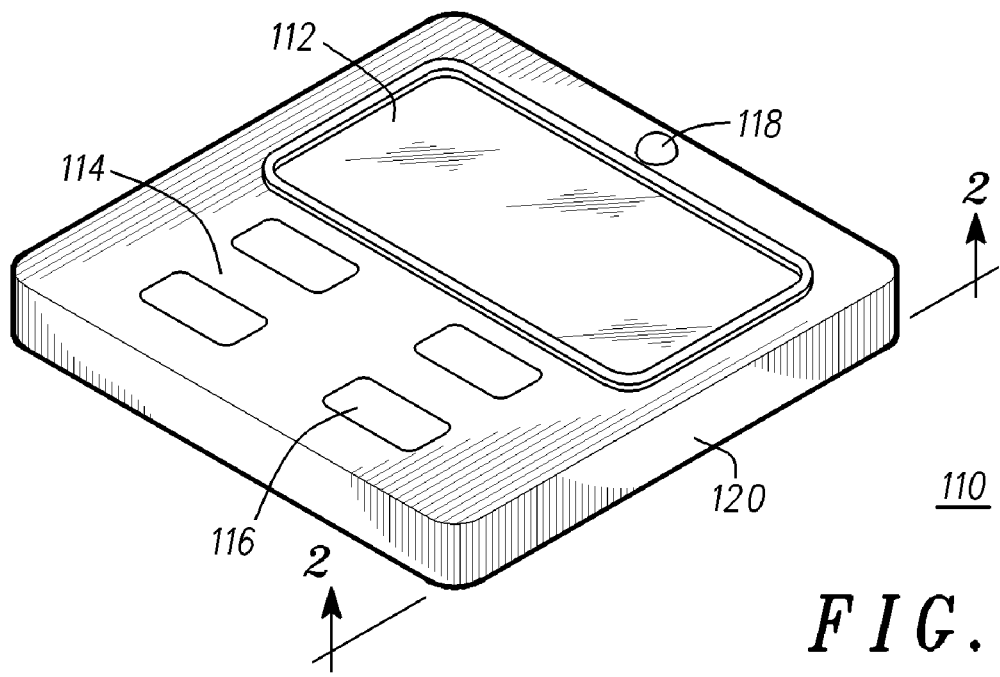
FIG. 1 is an isometric view of a portable communication device configured to incorporate the exemplary embodiments.

The following detailed description is merely exemplary in nature and is not intended to limit the invention or the application and uses of the invention. Furthermore, there is no intention to be bound by any theory presented in the preceding background or the following detailed description.

Photovoltaic cells are well known for providing electricity from solar panels in both small scale distributed power systems and centralized megawatt scale power plants. Photovoltaic cells also have found applications in consumer electronics, e.g., portable electronic equipment such as calculators and watches. The cells operate without toxic or noise emissions, and require little maintenance. These cells may also be used as sensors for detection of a wide band of radiation.

Photovoltaic cells originally developed by the Bell Telephone Laboratories in the 1950's were, and most of the larger cells produced today are crystalline silicon based due to the high quality silicon produced in large quantities by the semiconductor industry. Amorphous silicon may be found in low power sources in portable electronic devices, even though solar conversion efficiency is limited.

There are several key issues in the use of photovoltaic (PV) cells for portable applications. These issues include cost, robustness, stability, efficiency, and toxicity of materials used in PV cells.

Using PV to trickle-charge the handset battery is attractive because it extends the battery life and enables emergency use of the phone in situations when the handset battery is depleted and the outlet charging capability is not readily available. Additionally, using PV for trickle charging the handset battery may also find use in situation when power from the electrical grid is not available in the developing countries. Aside from the cost, three issues need to be considered when incorporating PV cells into a handset. The first is the mechanical robustness. Most of the PV cells such as those made of single crystal semiconductors or thin films can break or scratch quite easily when exposed. The second is the handset appearance. Electrodes on PV cells, when placed at the handset exterior, make the overall appearance less attractive. The third issue is the PV cell performance on/in a handset. All three of these issues are resolved by the embodiments described herein. PV cells are placed inside a handset and mechanically reinforced. An over-layer embedded with fluorescent species as a fluorescent converter efficiently collects and down converts a broad spectrum of white (ambient) light into light with a much narrower spectrum distribution which is determined by the optical properties of the fluorescent species. The combined transparent shell/fluorescent layer obscure the PV cell so that its presence won't affect the overall handset appearance. Fluorescent species with quantum efficiency at least 80% or higher are preferred so that their presence will not substantially reduce the light intensity.

Quantum dots (QDs) with quantum efficiency greater than one (multi-exciton behavior) so that one UV or near UV photon can be converted into multiple IR photons improves the PV cell performance when placed on phone shell or PV cells. The energy of the photons emitted from the fluorescent species must be at least equal to the energy gap of the PV material so that electron-hole pairs can be created in the PV cell upon irradiation. Alternatively, fluorescent species can be imbedded in phone shell and form a single layer fluorescent phone housing.

Fluorescent species are imbedded in a transparent matrix placed outside the handset shell. The fluorescent species have strong quantum efficiencies and emit light preferably in visible or near the IR regime (~400-1000 nm). Example of fluorescent species are QDs, dye molecules, or other materials that exhibit a strong photo-fluorescent behavior with quantum efficiency of 80% or higher. The fluorescent species can emit single or multiple wavelengths. The matrix layer can be organic, inorganic, or a mixture of the two, and they are transparent in UV, visible regime and near IR regime. This layer can be applied on to the handset housing via coating, deposition, painting, etc. It can be in single-layer or multi-layers formation in either solid and/or porous form with appropriate pore size(s). This film can also have built-in desired periodic structures which act as a photonic material that enhances the reflection of the fluorescent light. The matrix layer preferably has a refractive index matched with the handset shell to maximize light transmission.

The fluorescent species can be imbedded into the matrix layer by pre-mixing with the solution based matrix material prior to being applied to the handset housing, or imbedded into the matrix layer placed on handset housing using various solution or gas phase based impregnation processes. The fluorescent species can also be incorporated into the matrix layer via layering processes.

The surface of the matrix layer is preferred to be covered with a coating layer that serves as a barrier layer which prevents oxidation/degradation of the fluorescent species. This layer has the correct refractive index and thickness so that it also helps to enhance the internal reflection of the lights emitted from the fluorescent species. Additionally, it is preferred that this layer has a greater mechanical hardness so that it also serves as an anti-scratch protecting layer. Part of this layer can further have periodic structures which serve as a photonic crystal for efficient reflection of the fluorescent light.

The PV cells are placed at the opposite side of the handset shell (inside the phone) and are well exposed to the fluorescent light and the residual light not being absorbed by the fluorescent layer. In this configuration the presence of fluorescent species and the matrix layer largely obscures the PV cells, down converts the light to a narrower spectrum, and improves the PV performance. Additionally, having the PV cells placed inside the phone allows one to utilize various packaging methods to mechanically reinforce the PV cells without affecting the handset appearance. The PV cells can be in the form of single crystal or thin film. The handset shell is a transparent material and has an optional layer with matched refractive index disposed between the handset shell and PV cells so that the fluorescent lights can be transmitted to the PV cells without losing intensity. Alternatively, fluorescent species can be imbedded in the handset shell and form a single layer fluorescent housing.

The light emitting species preferred in this embodiment are fluorescent dye molecules or free standing quantum dots (FSQDs) which are sometimes called semiconductor nanocrystallites, whose radii are smaller than the bulk exciton Bohr radius and constitute a class of materials intermediate between molecular and bulk forms of matter. FSQDs are known for the unique properties that they possess as a result of both their small size and their high surface area. Furthermore, the absorption and emission properties vary with the particle size and can be systematically tailored. It has been found that a Cadmium Selenide (CdSe) quantum dot, for example, can emit light in any monochromatic, visible color, where the particular color characteristic of that dot is dependent on the size of the quantum dot.

Fluorescent dye molecules or FSQDs are easily incorporated into or on other materials such as polymers and polymer composites because they can be made to be soluble in a variety of media and have little degradation over time. These properties allow them to reach almost 100% fluorescent quantum yield.

Fluorescent dye molecules may comprise, for example, rhodamine B, rhodamine 6G, Coumarin 540.

Instead of fluorescent dye molecules and quantum dots, other inorganic fluorescent materials such as rare-earth doped fluorescent glasses, Cr doped sapphire, and Mg or Cu doped II-VI semiconductors can also be used for this purpose.

FSQD are semiconductors composed of periodic groups of II-VI, III-V, IV, or IV-VI materials, for example, CdS, CdSe, CdTe, ZnS, ZnSe, ZnTe, GaAs, GaP, GaAs, GaSb, HgS, HgSe, HgTe, InAs, InP, InSb, AlAs, AlP, AlSb. Alternative FSQDs materials that may be used include but are not limited to tertiary microcrystals such as InGaP, which emits in the yellow to red wavelengths (depending on the size) and ZnSeTe, ZnCdS, ZnCdSe, and CdSeS which emits from blue to green wavelengths. Multi-core structures are also possible such as ZnSe/ZnXS/ZnS, where X represents Ag, Sr, Te, Cu, or Mn. The inner most core is made of ZnSe, followed by the second core layer of ZnXS, completed by an external shell made of ZnS.

FSQDs range in size from 2-10 nanometers in diameter (approximately $10^2$-$10^7$ total number of atoms). At these scales, FSQDs have size-tunable band gaps, in other words there spectral emission depends upon size. Whereas, at the bulk scale, emission depends solely on the composition and defectivity of matter. Other advantages of FSQDs include high photoluminescence quantum efficiencies, good thermal and photo-stability, narrow emission line widths (atom-like spectral emission), and compatibility with solution processing. FSQDs are manufactured conventionally by using colloidal solution chemistry.

FSQDs may be synthesized with a wider band gap outer shell, comprising for example ZnO, ZnS, ZnSe, ZnTe, CdO, CdS, CdSe, CdTe, MgS, MgSe, GaAs, GaN, GaP, GaAs, GaSb, HgO, HgS, HgSe, HgTe, InAs, InN, InP, InSb, AlAs, AlN, AlP, AlSb. The shell surrounds the core FSQDs and results in a significant increase in the quantum yield. Capping the FSQDs with a shell reduces non-radiative recombination and results in brighter emission. The surface of FSQDs without a shell has both free electrons in addition to crystal defects. Both of these characteristics tend to reduce quantum yield by allowing for non-radiative electron energy transitions at the surface. The addition of a shell reduces the opportunities for these non-radiative transitions by giving conduction band electrons an increased probability of directly relaxing to the valence band. The shell also neutralizes the effects of many types of surface defects. The FSQDs are more thermally stable than organic phosphors since UV light will not chemically breakdown FSQDs. The exterior shell can also serve as an anchor point for chemical bonds that can be used to modify and functionalize the surface.

Due to their small size, typically on the order of 10 nanometers or smaller, the FSQDs have larger band gaps relative to a bulk material. It is noted that the smaller the FSQDs, the higher the band gap. Therefore, when impacted by a photon (emissive electron-hole pair recombination), the smaller the diameter of the FSQDs, the shorter the wavelength of light will be released. Capping ligands (molecules) on the outer surface of the shell allow the FSQDs to remain in the colloidal suspension while being grown to the desired size.

FIG. 1 is an isometric view of an electronic device 110 comprising a display 112, a control panel 114 including a plurality of touch keys 116, and a speaker 118, all encased in a housing 120. The electronic device 110 may be any type of device requiring a battery as the main source of power or as a back-up source of power. For the exemplary embodiment of a mobile communication device, a Lithium ion battery is preferred; however, any type of rechargeable battery may be charged by the method described herein. Some electronic devices 110, e.g., a cell phone, may include other elements such as an antenna, a microphone, and a camera (none shown). Furthermore, while the preferred exemplary embodiment of an electronic device is described as a mobile communication device, for example, cellular telephones, messaging devices, and mobile data terminals, other embodiments are envisioned, for example, personal digital assistants (PDAs), computer monitors, gaming devices, video gaming devices, cameras, and DVD players.

Figure 2:
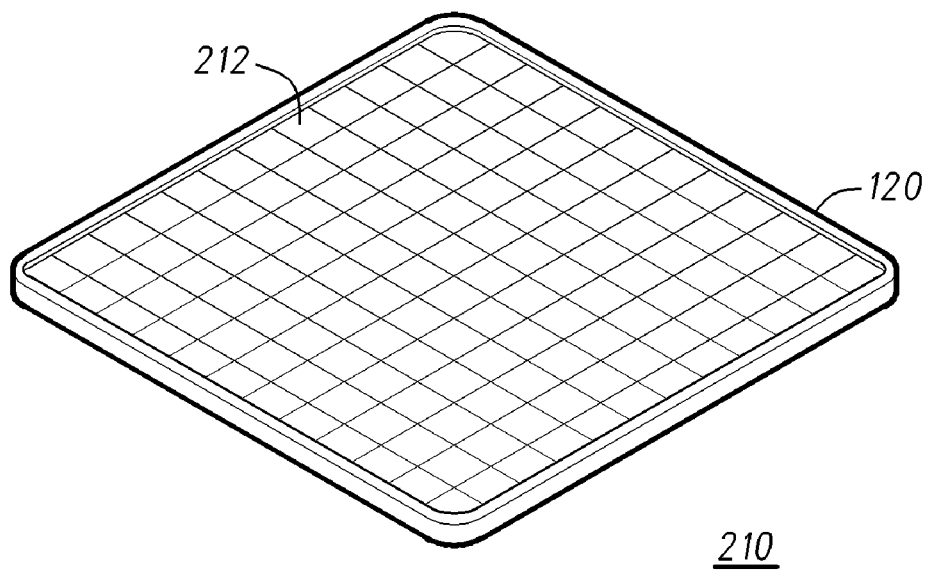
FIG. 2 is an isometric back view of the portable communication device taken along line 2-2 of FIG. 1 and in accordance with an exemplary embodiment.

FIG. 2 is an isometric view of the electronic device 110 taken along line 2-2 of FIG. 1. In accordance with an exemplary embodiment, photovoltaic cells 212 are disposed within the housing 120 and contiguous to the back side (not shown) of the housing 120.

Figure 3:
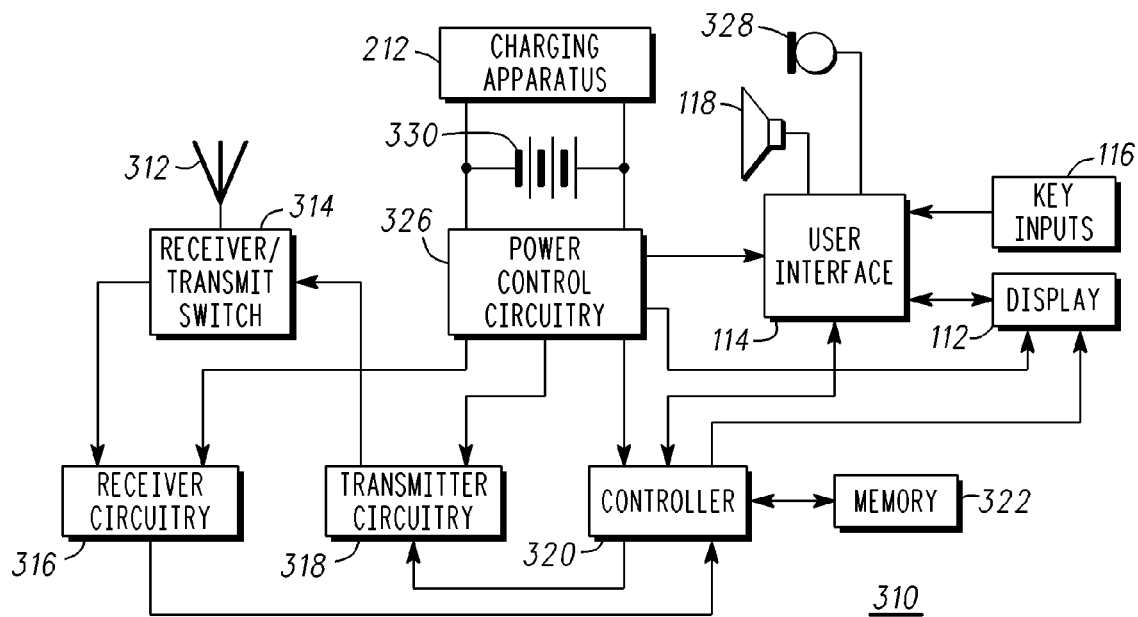
FIG. 3 is a block diagram of one possible portable communication device of FIG. 1.

Referring to FIG. 3, a block diagram of an electronic device 310 such as a cellular phone is depicted. Though the exemplary embodiment is a cellular phone, the display described herein may be used with any electronic device in which information, colors, or patterns are to be presented through light emission. The portable electronic device 310 includes an antenna 312 for receiving and transmitting radio frequency (RF) signals. A receive/transmit switch 314 selectively couples the antenna 312 to receiver circuitry 316 and transmitter circuitry 318 in a manner familiar to those skilled in the art. The receiver circuitry 316 demodulates and decodes the RF signals to derive information therefrom and is coupled to a controller 320 for providing the decoded information thereto for utilization in accordance with the function(s) of the portable communication device 310. The controller 320 also provides information to the transmitter circuitry 318 for encoding and modulating information into RF signals for transmission from the antenna 312. As is well-known in the art, the controller 320 is typically coupled to a memory device 322 and a user interface 114 to perform the functions of the portable electronic device 310. Power control circuitry 326 is coupled to the components of the portable communication device 310, such as the controller 320, the receiver circuitry 316, the transmitter circuitry 318 and/or the user interface 114, to provide appropriate operational voltage and current to those components. The user interface 114 includes a microphone 328, a speaker 118 and one or more touch key inputs 116. The user interface 114 also includes a display 112 which could receive touch screen inputs. The charging apparatus 212 is coupled to charge the battery 330 and may be coupled in series or parallel depending on the voltage and current requirements. Though PV cells are preferred for use with the charging apparatus 212, other apparatus for converting light into electricity, such as thermal cells (light to heat to electricity) may be used.

Figure 4:
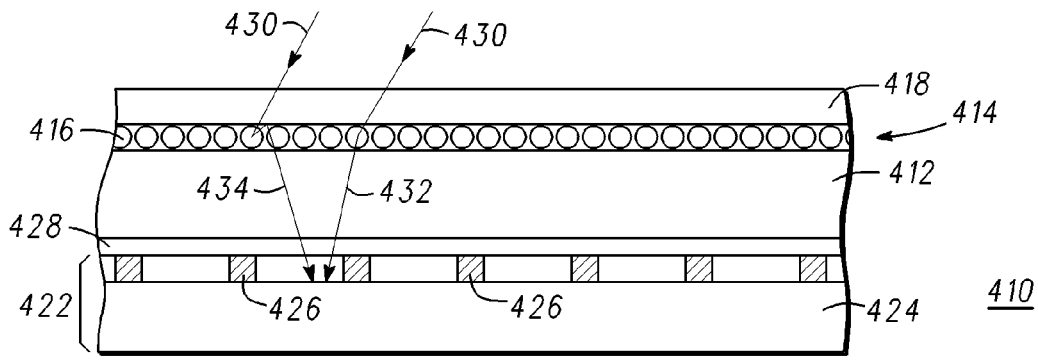
FIG. 4 is a partial cross section view of one exemplary embodiment.

In accordance with the preferred embodiment, all or a portion of the housing 120 of the portable electronic device 110 of FIG. 1, is a transparent layer 412 as shown in FIG. 4. The transparent layer 412 provides the structural support and preferably comprises a polymer, but may comprise any rigid or flexible transparent material, and either organic, inorganic, or a mixture thereof. A layer 414 is formed over the transparent layer 412 and includes a fluorescent species 416, such as a plurality of FSQDs; or other fluorescent species including dye molecules and phosphor particles may be used for converting ambient light, e.g., from the sun and office fluorescent lighting, to a narrower spectrum distribution as well as obscuring PV cells inside the housing 412. And though a single layer with embedded fluorescent species is shown, a plurality of layers may be used. Furthermore, though fluorescent species such as FSQDs are shown having a single diameter, FSQDs with more than one diameter would provide multiple wavelengths to the PV cells 422. This would provide multiple wavelength absorption or emissions, resulting in different housing colors. The layer 414 preferably is a transparent polymer having the fluorescent species 416 mixed within, but may be a porous layer made of transparent materials such as aluminum oxide, titanium oxide, zinc oxide, tin oxide, zirconium oxide, magnesium oxide, hafnium oxide, silicon oxide, yttrium oxide, lanthanum oxide, indium oxide, strontium oxide, barium oxide, or the various alloy or mixture forms of these materials with the fluorescent species imbedded within. The porous material would define cavities having a diameter in the range of 10 to 1000 nanometers. The porous material may be soaked in a solution of a fluorescent species, such as a dye, whereby the species would coat the material within the cavities. The layer 412 may also be several layers of fluorescent species. The quantum efficiency of the fluorescent species preferably is 80% or higher. FSQDs with a quantum efficiency greater than 100% can be used to convert a single photon into multiple photons with longer wavelength. Additionally, the fluorescent species may be a mixture of species that absorb and emit light at different wavelengths, thus offering different colors for the device housing. Optionally, a layer 428 may be placed between 412 and 426. The refractive index of layer 428 matches with that of 412 so that its presence enhances the light transmission from 412 to 424.

An optional coating layer 418 is formed over the layer 414 that serves as a barrier which prevents oxidation and degradation of the fluorescent species within layer 414. Preferably, the coating layer 418 has a refractive index and thickness for enhancing the internal reflection of the photons emitted from the fluorescent species, and also has a greater mechanical hardness so that it also serves as an anti-scratch surface layer. The coating layer 418 may comprise, for example, diamond-like carbon, silicon nitride, silicon carbide, silicon oxide, titanium dioxide, zirconium oxide, in either a single layer or multiple layers.

The PV cells 422 include any known PV cell, and typically include photovoltaic material 424 and electrodes 426 with electrodes typically placed at the front side of the photovoltaic material. The PV material 424 may be silicon, cadmium telluride, or copper indium gallium diselenide, or gallium arsenide, for example. The electrodes may be any conductor, for example, copper or aluminum.

In operation, light 430, for example, sun light, passes through the coating layer 418 and strikes the fluorescent species, for example, fluorescent dye and/or FSQDs 416. One or more photons 432 are emitted by the fluorescent species and migrate through the transparent housing 412 to strike the PV material 424. Charges (not shown) are then extracted from the PV material 424 in a known manner. Photons 434 emitted from the fluorescent species 416 towards the coating layer 418 are reflected back to the PV material 424.

Figure 5:
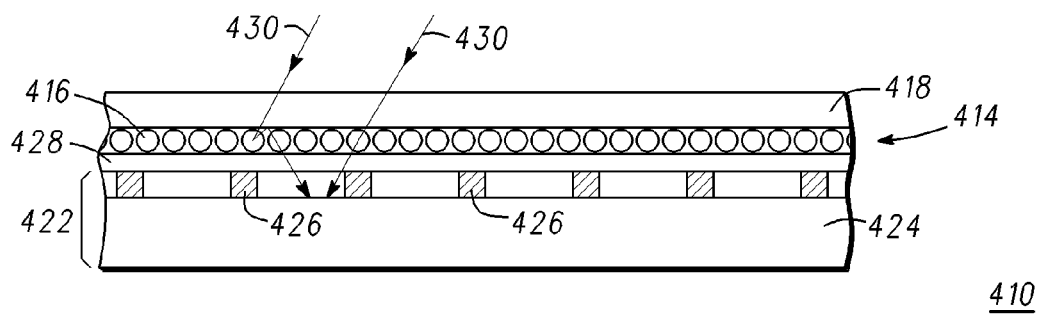
FIG. 5 is a partial cross section view of another exemplary embodiment.

In another embodiment shown in FIG. 5, the supporting layer 412 (of FIG. 4) and the fluorescent layer 414 may be combined into a single layer of fluorescent species such as dye molecules and FSQDs embedded in a transparent matrix material. Additionally, this layer 414 may comprise the housing. This combined layer serves as a shell for the device housing and at the same time also obscures the PV cells placed inside the device housing. The optional layer 418 is placed on this combined layer for increased internal reflection of the light emitted from the fluorescent species. Additionally, the optional optical matching layer 428 is placed between the combined layer and PV cells to maximize the light transmission to the PV cells.

Figure 6:
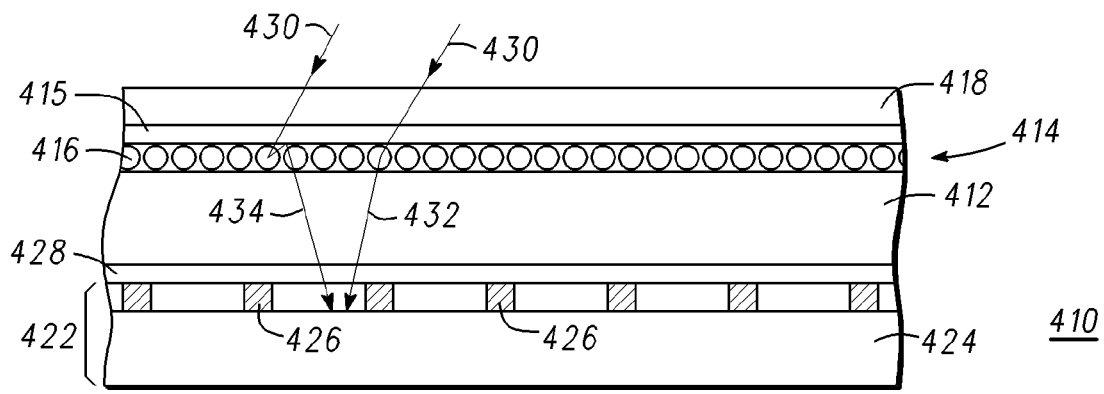
FIG. 6 is a partial cross sectional view of still another exemplary embodiment.

In yet another embodiment, part of the layer 414 as shown in FIGS. 4 and 5, or a separate layer 415 formed on the layer 414 as shown in FIG. 6, may have a form of photonic crystal with desired lattice spacing so that it serves as an efficient mirror that reflects light emitted by the fluorescent species.

Figure 7:
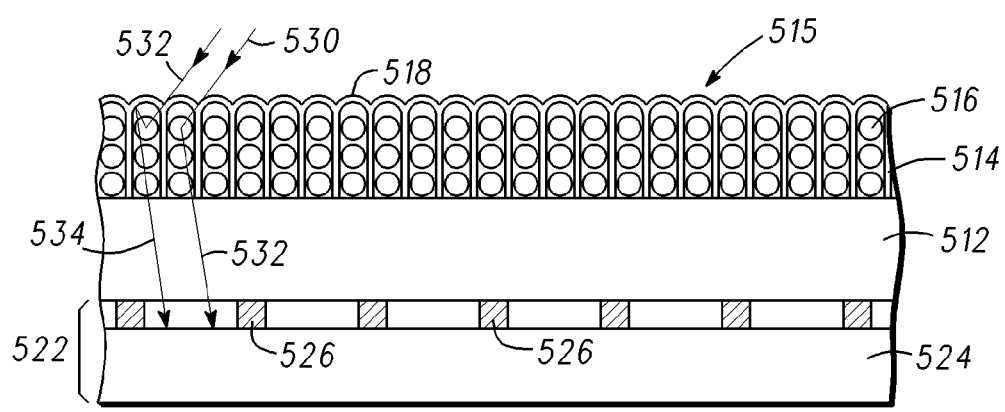
FIG. 7 is a partial cross sectional view of yet another exemplary embodiment.

Another embodiment shown in FIG. 7 includes a portion of the housing 120 of the portable electronic device 110 of FIG. 1 as a transparent layer 512. The transparent layer 512 provides the structural support and preferably comprises a polymer, but may comprise any rigid or flexible transparent material, and either an organic, inorganic, or a combination thereof. A layer 514 is formed over the transparent layer 512 with channels 513 being formed within. A fluorescent species, for example a fluorescent dye 516 is disposed within the channels 515; however, any fluorescent species including FSQDs and phosphor particles may be used for converting white light to a narrower spectrum distribution as well as obscuring PV cells inside the housing 512. The quantum efficiency of the fluorescent species preferably is 80% or higher. FSQDs with a quantum efficiency greater than 100% can be used to convert a single photon into multiple photons. Additionally, the fluorescent species may be a mixture of species that absorb and emit light at different wavelengths, and provide a desirable color for the device housing.

An optional coating layer 518 is formed over the layer 514, channels 515, and fluorescent species 516 that serves as a barrier which prevents oxidation and degradation of the fluorescent species within layer 514. Preferably, the coating layer 518 has a refractive index and thickness for enhancing the internal reflection of the photons emitted from the fluorescent species, and also with desired mechanical hardness that protects the surface against scratching. Additionally, the coating layer 518 may be formed a hemispherical shape to enhance light collection efficiency through a self assembly method.

The PV cells 522 include any known PV cell, and typically include photovoltaic material 524 and electrodes 526. The PV material 524 may be silicon, cadmium telluride, or copper indium gallium diselenide, or gallium arsenide, for example. The electrodes may be any conductor, for example, copper or aluminum.

In operation, light 530, for example, sun light, passes through the coating layer 518 and strikes the fluorescent species 514. One or more photons 532 are emitted by the fluorescent species and migrate through the transparent housing 512 to strike the PV material 524. Charges (not shown) are then extracted from the PV material 524 in a known manner. Photons 534 emitted from the fluorescent species 514 towards the coating layer 518 are reflected back to the PV material 524.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. A power source for charging a battery within a portable electronic device having a housing, the power source comprising:
   a photovoltaic apparatus for charging the battery, the photovoltaic apparatus disposed within the housing, wherein the housing supports the photovoltaic apparatus and comprises a transparent material to pass light to the apparatus;
   a fluorescent species embedded on the transparent material providing a combined layer, the fluorescent species collecting a broad spectrum of light and down converting the broad spectrum of light into light having a narrow range of wavelengths, and the combined layer obscuring the photovoltaic apparatus such that the presence of the photovoltaic apparatus does not affect the overall appearance of the electronic device, the combined layer disposed in the housing to pass the narrow range of wavelengths to the photovoltaic apparatus; and
   a refractive index layer disposed between the photovoltaic apparatus and the combined layer that improves light transmission to the photovoltaic apparatus, wherein a refractive index of the refractive index layer matches a refractive index of the housing.

2. The power source of claim 1 wherein the photovoltaic apparatus comprises a plurality of photovoltaic cells.

3. The power source of claim 1 wherein the photovoltaic apparatus comprises an element selected from the group consisting of: a plurality of thermoelectric cells and a plurality of mechanical harvesters.

4. The power source of claim 1 wherein the fluorescent species comprises a plurality of quantum dots.

5. The power source of claim 1 wherein the fluorescent species comprises a plurality of fluorescent dye molecules.

6. The power source of claim 1 further comprising:
   a reflective layer disposed on the fluorescent species that reflects emitted light.

7. The power source of claim 6 wherein the reflective layer comprises an anti-mechanical damage layer.

8. The power source of claim 1 further comprising:
   a layer of a plurality of photonic crystals disposed adjacent to the fluorescent species.

* * * * *